United States Patent Office 3,288,805
Patented Nov. 29, 1966

3,288,805
2-(5',6',7',8'-TETRAHYDRONAPHTHYL-1')-
AMINO-IMIDAZOLINE
Alex Berg, Biberach an der Riss, Germany, assignor to
  Boehringer Ingelheim G.m.b.H., Ingelheim (Rhine),
  Germany, a corporation of Germany
No Drawing. Filed July 27, 1965, Ser. No. 475,226
Claims priority, application Germany, Aug. 4, 1961,
T 20,558
4 Claims. (Cl. 260—309.6)

This is a continuation-in-part of copending application Ser. No. 292,449, filed July 2, 1963, now abandoned, which in turn is a continuation-in-part of application Ser. No. 213,603, filed July 31, 1962, now abandoned.

In said copending application No. 213,603, a certain tetrahydronaphthylamino-imidazoline and its acid addition salts are disclosed, as well as two different methods of preparing these compounds. One of these methods involves the catalytic hydrogenation of 2-naphthylamino-imidazoline of the formula

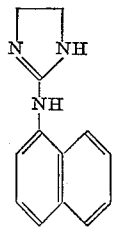

or an acid addition salt thereof with hydrogen in the presence of a hydrogenation catalyst, preferably Raney nickel. The preponderance of the prior literature relating to hydrogenation of amino-substituted naphthalene compounds indicated that hydrogenation would take place in that ring portion of the naphthalene nucleus which has the amino group attached thereto. Consequently, based on the information available from the literature, it was assumed that hydrogenation of 2-naphthylamino-imidazoline or an acid addition salt thereof would yield 2-(1',2',3',4'-tetrahydronaphthyl-1')-amino-imidazoline of the formula

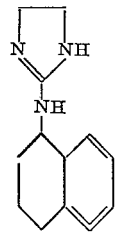

or an acid addition salt thereof depending on whether the starting material is the free base or an acid addition salt.

Since the filing of said application No. 213,603, however, I have ascertained by nuclear resonance spectography and preparation of position isomers that the original widely accepted assumption regarding the hydrogenation of the naphthalene nucleus was erroneous and that, in fact, hydrogenation under the conditions set forth in my copending application above referred to takes place in the unsubstituted ring portion of the naphthalene nucleus. The same erroneous assumption was made in connection with the second method described in said copending application which involves the reaction of an S-alkyl-N-tetrahydronaphthyl-isothiouronium hydrogen halide with ethylenediamine. I have ascertained that the S-alkyl-N-tetrahydronaphthyl-isothiouronium compound III obtained by the process steps described on page 4 of the copending application, second full paragraph, is an S-alkyl-N-(5',6',7',8'-tetrahydronaphthyl-1')isothiouronium hydrogen halide rather than an S-alkyl-N-(1',2',3',4'-tetrahydronaphthyl-1')-isothiouronium hydrogen halide.

In other words, I have now determined that, following the procedures set forth under methods A and B in my prior application Serial No. 213,603, the actual reaction product obtained thereby is 2-(5',6',7',8'-tetrahydronaphthyl-1')-amino-imidazoline of the formula

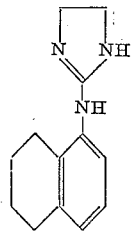

instead of 2-(1',2',3',4'-tetrahydronaphthyl-1')-amino-imidazoline.

Thus, this invention relates to 2-(5',6',7',8'-tetrahydronaphthyl-1')-amino-imidazoline and its acid addition salts, as well as to various methods of preparing these compounds.

More particularly, the present invention relates to the compound of the formula

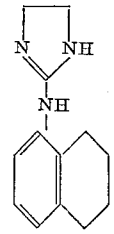

(I)

and its acid addition salts, notably its non-toxic, pharmacologically acceptable acid addition salts.

The compounds of the present invention, that is, 2-(5',6',7',8' - tetrahydronaphthyl - 1')-amino-imidazoline and its non-toxic acid addition salts may be prepared by a number of methods which are well known in principle and have been used for the preparation of other imidazoline derivatives having a basic substituent in the 2-position. However, the following methods have been found to be especially convenient and advantageous.

*Method A.*—Catalytic hydrogenation of 2-(naphthyl-1')-amino-imidazoline of the formula

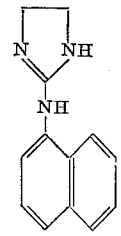

(II)

or an acid addition salt thereof, preferably a hydrogen halide acid addition salt, with hydrogen in the presence of a hydrogenation catalyst. The catalyst for this hydrogenation reaction may be any known hydrogenation catalyst; however, Raney nickel has been found to be especially effective. The hydrogenation is performed at elevated pressures, preferably at a pressure of 50 to 150 atmospheres, and at a temperature above 80° C. Most advantageously, the hydrogenation reaction is carried out in the presence of an inert organic solvent, especially in the presence of a lower alkanol, such as methyl or ethyl alcohol. The best yields are obtained if an acid addition salt of the naphthyl-amino-imidazoline, preferably a hydrogen halide acid addition salt, is used as the starting material for the hydrogenation instead of the free base.

The hydrogenation reaction is complete when the hydrogen absorption has ceased; thereafter, the hydrogenation product is isolated in customary fashion and purified by recrystallization from an inert solvent.

*Method B.*—Reaction of an S-alkyl-N-(5′,6′,7′,8′-tetrahydronaphthyl-1′)-isothiouronium hydrogen halide of the formula

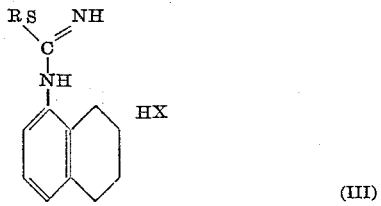

wherein R is lower alkyl and X is halogen, with preferably an equimolar amount of ethylenediamine at elevated temperatures, preferably at temperatures above 60° C. The reaction may, if desired, be performed in the presence of an anhydrous inert organic solvent, but it is preferred to carry it out without a solvent in vacuo, so that the alkylmercaptan and ammonia formed by the reaction are immediately removed from the reaction mixture. Under these conditions the reaction residue is a semi-crystalline mass which can be suspended in water, and the resulting slurry can be filtered on a vacuum filter to isolate the raw reaction product. However, if the reaction is carried out in the presence of an anhydrous inert organic solvent, such as methanol, benzene or the like, the reaction mixture must be subjected to prolonged heating, i.e. for about one day, preferably at the boiling point of the particular inert solvent which is employed. The raw hydrogen halide acid addition salt thus obtained as the reaction product may be readily converted into the corresponding free base of the Formula I by customary methods, and may then be isolated and purified by recrystallization.

The free base compound obtained by methods A and B may, if desired, be readily converted into any desired non-toxic, pharmacologically acceptable acid addition salt, such as the hydrochloride, sulfate, phosphate, citrate, succinate, maleate, 8-chloro-theophyllinate and the like, by customary method, that is, by acidifying a solution of the free base with the corresponding inorganic or organic acid.

Evidently, the compound of the present invention, that is, 2 - (5′,6′,7′,8′-tetrahydronaphthyl-1′)-amino-imidazoline, may also be prepared by other known methods for the preparation of imidazolines which have a basic substituent in the 2-position, but the yields are smaller than in methods A and B described above. For instance, the free base compound of the present invention may also be prepared by reacting a 2-alkylmercapto-imidazoline with 5-amino-1,2,3,4-tetrahydronaphthaline at elevated temperatures, and, if desired, the compound of the present invention may also be obtained by reacting 5-amino-1,2,3,4-tetrahydronaphthaline with 2-nitroamino-imidazoline or with another reactive derivative of imidazoline.

The naphthyl-amino-imidazoline (II), which is used as the starting compound in Method A., may be prepared from a 2-alkylmercapto-imidazoline and α-naphthylamine by the process described in German Patent No. 539,179.

The isothiouronium salts (III), which are used as starting compounds in method B, may be prepared in known fashion by reacting N-(5,6,7,8-tetrahydronaphthyl-1)-thiourea with an alkyl halide in the presence of an inert organic solvent. The N-(5,6,7,8-tetrahydronaphthyl-1)- thiourea (M.P. 157° C.), in turn, may be obtained by reacting tetrahydronaphthylamine and ammonium thiocyanate in hydrochloric acid solution.

The following examples shall further illustrate the present invention and enable other skilled in the art to understand it more completely. It should be understood, however, that the present invention is not limited solely to these examples.

EXAMPLE I

*Preparation of 2-(5′,6′,7′,8′-tetrahydronaphthyl-1′)-amino-imidazoline by Method A*

169.5 gm. (0.5 mol) of 2-(α-naphthylamino)-imidazoline hydroiodide were dissolved in 750 cc. of ethanol, and 75 gm. of Raney nickel (moist weight) were added to the solution. The resulting mixture was then hydrogenated with hydrogen at a pressure of 100 atmospheres and at a temperature of 100° C. After the theoretical amount of hydrogen had been absorbed, the reaction mixture was separated from the Raney nickel catalyst by vacuum filtration and the filtrate was concentrated by evaporation in vacuo. The concentrate was made alkaline with sodium hydroxide to liberate the free base reaction product, which precipitated out. The precipitate was separated by vacuum filtration, washed with water and recrystallized from isopropanol. The product was identified to be 2-(5′,6′,7′,8′-tetrahydronaphthyl-1′)-amino-imidazoline of the formula

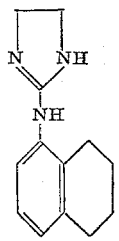

It had a melting point of 142–143° C.

*Analysis:*—$C_{13}H_{17}N_3$. Calculated: C, 72.52%; H, 7.96%; N, 19.52%. Found: C, 72.35%; H, 8.09%; N, 19.60%.

The hydrochloride addition salt was obtained by preparing a concentrated solution of the free base in isopropanol, acidifying the solution with ethereal hydrochloric acid and precipitating the addition salt with ether. Recrystallization of the raw hydrochloride from a mixture of ethanol and ether or a mixture of acetone and ether yielded the pure hydrochloride having a melting point of 96–98° C. (containing 1 mol of water of crystallization) and 172–174° C. (without water of crystallization).

*Analysis:*—Basic N-titration. Calculated: N, 5.22%. Found: N, 5.23%.

EXAMPLE II

*Preparation of 2-(5′,6′,7′,8′-tetrahydronaphthyl-1′)-amino-imidazoline by Method B*

36.2 gm. (0.1 mol) of N-(5′,6′,7′,8′-tetrahydronaphthyl-1′)-S-methyl-isothiouronium hydroiodide (m.p. 177° C.) were admixed with 6 gm. (0.1 mol) of anhydrous ethylene-diamine, and the mixture was gently heated under vacuum of a water aspirator pump. After the evolution of methyl mercaptan and ammonia had ceased, the semi-crystalline reaction mass was suspended in ethanol to form a slurry, which was vacuum filtered. The filter cake consisted of raw 2-(5′,6′,7′,8′-tetrahydronaphthyl-1′)-amino-imidazoline hydroiodide. The free base was obtained by neutralization with sodium hydroxide, as described in Example I; it had a melting point of 142° C.

*Analysis:*—Basic N-titration. Calculated: N, 6.51%. Found: N, 6.61%.

The hydroiodide of the free base was also obtained by boiling the isothiouronium salt with an equivalent amount of ethylenediamine in methanolic solution for at least twenty hours.

The compounds according to the present invention, that is, 2-(5',6',7',8'-tetrahydronaphthyl-1')-amino-imidazoline and its non-toxic, pharmacologically acceptable acid addition salts, exhibit useful pharmacological properties in warm-blooded animals. More particularly, they exhibit a strong labor-inducing and vasoconstrictive activity, as well as hypertensive properties. On the contrary 2-(1',2',3',4'-tetrahydronaphthyl-1')-amino-imidazoline exhibits only a weak pharmacological efficacy.

For pharmacological purposes, the compounds according to the present invention are administered perorally, parentarally or topically in form of dosage unit compositions, that is, in the form of compositions consisting essentially of one dosage unit of the active ingredient and an inert-physiologically compatible carrier. The labor inducing dose of the compounds of the present invention is 50–100 γ/kg., and for vaso-constrictive purposes, the composition should contain from 0.01 to 5.0%, preferably 0.05–1%, by weight of the active ingredient.

Clinical tests have shown that the compounds of the invention are useful for the treatment of acute, chronic and allergic forms of rhinitis, as well as tumefation conditions in the pharynx, angina retronasalis, catarrh of the bronchial tubes and ensuing otitis. The average activity begins within 3.6 minutes of administration and lasts for an average of 4.2 hours. Sedative side effects are not present which makes the compounds suitable for treatment of children. When used as an aerosol spray, the average single dosage is about 0.06 to 0.2 mg. preferably 0.12 mg., and the average daily dosage is 0.2 to 1.0 mg., preferably 0.5 mg., for adults.

The following examples illustrate a few dosage unit compositions comprising the hydrochloride of 2-(5',6',7',8'-tetrahydronaphthyl-1')-amino-imidazoline as the active ingredient. The parts are parts by weight unless otherwise specified.

EXAMPLE III

*Nose drops.*—The nose drop solution is compounded from the following ingredients:

| | Parts |
|---|---|
| 2-(5',6',7',8'-tetrahydronaphthyl-1')-amino-imidazoline·HCl | 0.1 |
| Sorbitol, 70% | 2.0 |
| Citric acid·$H_2O$ | 0.13 |
| Sodium phosphate, sec.·$2H_2O$ | 0.37 |
| Sodium chloride | 0.5 |
| Sodium ethylmercurithiosalicylate (merthiolate) | 0.0025 |
| Distilled water | 96.8975 |
| Total | 100.0 |

Compounding procedure: The ingredients, starting with merthiolate, are successively dissolved in the required amount of distilled water, and the solution is filtered until free from fibrous material.

EXAMPLE IV

*Eye drops.*—The eye drop solution is compounded from the following ingredients:

| | Parts |
|---|---|
| 2-(5',6',7',8'-tetrahydronaphthyl-1')-amino-imidazoline·HCl | 0.05 |
| Citric acid·$H_2O$ | 0.13 |
| Sodium phosphate, sec.·$2H_2O$ | 0.37 |
| Sodium chloride | 0.8 |
| Merthiolate | 0.0025 |
| Distilled water | 98.6575 |
| Total | 100.0 |

The compounding procedure is the same as in Example III.

EXAMPLE V

*Ointment.*—The ointment is compounded from the following ingredients:

| | Parts |
|---|---|
| 2-(5',6',7',8'-tetrahydronaphthyl-1')-amino-imidazoline·HCl | 0.1 |
| Distilled water | 15.0 |
| Paraffin oil | 18.0 |
| Vaseline | 54.1 |
| Ceresin | 4.0 |
| Cetyl alcohol | 1.0 |
| Wool grease alcohols | 4.0 |
| Beeswax | 1.5 |
| Sorbitol mono-oleate | 1.0 |
| p-Hydroxy-benzoic acid methyl ester | 0.2 |
| p-Hydroxy-benzoic acid propyl ester | 0.1 |
| Texachlorophene | 1.0 |
| Total | 100.00 |

Compounding procedure: The imidazoline compound is dissolved in the distilled water, and the solution is heated to 70° C. The paraffin oil, the Vaseline, the ceresin, the cetyl alcohol, the wool grease alcohols, the beeswax and the sorbitol-mono-oleate are melted together, the melt is heated to 70° C., and then the benzoic acid esters are dissolved therein. The aqueous imidazoline compound solution at 70° C. is stirred into the melt, also at 70° C., and the mixture is then cooled to 40° C. The finely powdered hexachlorophene is introduced into the mixture by means of an immersion homogenizer, and the resulting mixture is cooled to room temperature while stirring. The resulting ointment is then homogenized by rolling.

EXAMPLE VI

*Nose ointment.*—The ointment is compounded from the following ingredients:

| | Parts |
|---|---|
| 2-(5',6',7',7',8'-tetrahydronaphthyl-1')-amino-imidazoline·HCl | 0.1 |
| Vaseline | 70.0 |
| Paraffin oil | 29.9 |
| Total | 100.0 |

Compounding procedure: The Vaseline and the paraffin oil are melted together and the melt is heated to 40° C. The finely powdered imidazoline compound is then stirred into the melt with the aid of an immersion homogenizer. The finished ointment mixture is stirred until cold.

EXAMPLE VII

*Dusting powder.*—The dusting powder is compounded from the following ingredients:

| | Parts |
|---|---|
| 2-(5',6',7',8-tetrahydronaphthyl-1')-amino imidazoline·HCl | 0.1 |
| Wool grease | 2.0 |
| Isopropyl myristate | 3.0 |
| Zinc oxide | 3.0 |
| Silicic acid, finely divided | 2.0 |
| Talcum | 89.9 |
| Total | 100.0 |

Compounding procedure: (1) The wool grease and the isopropyl myristate are melted together and the molten mixture is heated to 70° C. The zinc oxide is added as well as a sufficient amount of talcum to form a crumbly mass. The resulting mixture is cooled and forced through a 1 mm.-mesh screen to form a granulate.

(2) The imidazole compound and talcum are admixed to form a mixture containing 10% by weight of imidazoline compound.

(3) The granulate obtained in step (1) and the mixture of step (2) are combined with the remaining amount of talcum and with the silicic acid, and the resulting mixture is milled.

EXAMPLE VIII

*Lotion.*—The lotion is compounded from the following ingredients:

|  | Parts |
|---|---|
| 2 - (5',6',7',8' - tetrahydronaphthyl - 1') - amino-imidazoline·HCl | 0.1 |
| Citric acid·H$_2$O | 0.13 |
| Sodium phosphate, sec.·2H$_2$O | 0.37 |
| Cetyl-stearyl alcohol (Lanette N) | 2.0 |
| Isopropyl myristate | 2.0 |
| Glycerin | 3.0 |
| p-Hydroxy-benzoic acid methyl ester | 0.1 |
| p-Hydroxy-benzoic acid propyl ester | 0.25 |
| Distilled water | 92.25 |
| Total | 100.00 |

Compounding procedure: 80 parts of the distilled water are heated to 80° C. and the benzoic acid esters are dissolved therein while stirring. The glycerin is added to the aqueous solution (Phase A). The cetyl-stearyl alcohol and the isopropyl myristate are melted together and the molten mixture is heated to 65° C. (Phase B). Phase B is added to Phase A at 65° C. while stirring. The resulting emulsion is cooled to 40° C., and a solution of the citric acid, sodium phosphate and imidazoline compound in the remaining amount of distilled water is added thereto. The finished lotion is then stirred until cold.

EXAMPLE IX

*Aerosol.*—The aerosol spray composition is compounded from the following ingredients:

|  | Parts |
|---|---|
| 2 - (5',6',7',8' - tetrahydronaphthyl - 1') - amino-imidazoline·HCl | 12.0 |
| Isopropyl myristate | 500.0 |
| Sorbitol trioleate | 70.0 |
| Trifluoro-trichloro-ethane | 170.0 |
| Mixture of difluoro-dichloromethane and tetra-fluorodichloroethane (1:1), q.s. ad | 14,000 |

Compounding procedure: The micronized imidazoline compound (particle size max. 10µ) is stirred into a mixture of the isopropyl myristate and sorbitol trioleate, and the suspension is homogenized. The trifluoro-trichloroethane is added to the cold suspension, accompanied by stirring. 752 mgm. portions of the resulting mixture are poured into small aerosol cans. To each can enough of the propellent gas mixture is added under deep refrigeration to make a total of 14 gm. in each can. The cans are then provided with dosage spray valves. Each actuation of the valve release button releases 70 mgm. of the mixture which contain 60γ of the active ingredient.

Obviously, although the hydrochloride addition salt of 2 - (5',6',7',8' - tetrahydronaphthyl - 1') - amino - imidazoline is illustrated as the active ingredient in the above dosage unit compositions, any of the other non-toxic, pharmacologically acceptable acid addition salts of the compound or even the free base may be substituted in these examples for the hydrochloride; similarly, the dosage of the active ingredient may be varied in the illustrative examples within the indicated limits to meet specific needs and requirements.

While the present invention has been illustrated with the aid of certain specific embodiments, it will be readily apparent to others skilled in the art that the invention is not limited to these embodiments and that various changes and modifications may be made without departing from the spirit of the invention or the scope of the appended claims.

I claim:
1. A compound selected from the group consisting of 2 - (5',6',7',8' - tetrahydronaphthyl - 1') - amino - imidazoline of the formula

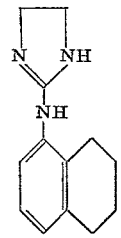

and its non-toxic, pharmacologically acceptable acid addition salts.

2. The hydrochloride of 2-(5',6',7',8'-tetrahydronaphthyl-1')-amino-imidazoline.

3. The hydroiodide of 2-(5',6',7',8'-tetrahydronaphthyl-1')-amino-imidazoline.

4. 2 - (5',6',7',8' - tetrahydronaphthyl - 1') - amino-imidazoline.

References Cited by the Examiner

UNITED STATES PATENTS

| 2,778,836 | 1/1957 | Morren | 260—309.6 |
| 2,876,222 | 3/1959 | Bloom | 260—256.4 |
| 2,899,426 | 8/1959 | Bloom | 260—309.6 |

OTHER REFERENCES

German application 1,147,712, Berg, printed April 25, 1963.

Merck Index, 7th ed., page 702, Rahway, Merck, 1960.

WALTER A. MODANCE, *Primary Examiner.*

NATALIE TROUSOF, *Assistant Examiner.*